United States Patent
Schnelle

[19]

[11] Patent Number: 6,162,143
[45] Date of Patent: Dec. 19, 2000

[54] TWO SPEED TRANSMISSION IN PARTICULAR PRE-TRANSMISSION FOR AUXILIARY AGGREGATE IN MOTOR VEHICLES

[75] Inventor: Klaus-Peter Schnelle, Ditzingen, Germany

[73] Assignee: Robert Bosch GmbH, Stuttgart, Germany

[21] Appl. No.: 09/414,141

[22] Filed: Oct. 7, 1999

[30] Foreign Application Priority Data

Oct. 7, 1998 [DE] Germany ............ 198 46 183

[51] Int. Cl.$^7$ ........................................ F16H 57/08
[52] U.S. Cl. .................................. 475/346; 475/347
[58] Field of Search ............................ 475/346, 347, 475/256, 259, 263, 264, 307

[56] References Cited

U.S. PATENT DOCUMENTS 4,854,192 8/1989 Churchill et al. ................ 74/752 E
4,943,268 7/1990 Eisenmann et al. ................ 475/95
5,489,244 2/1996 Zheng ............................... 475/183

Primary Examiner—Richard M. Lorence
Assistant Examiner—Tisha D. Waddell
Attorney, Agent, or Firm—Michael J. Striker

[57] ABSTRACT

A two speed transmission formed as a pre-transmission for an auxiliary aggregate in motor vehicles having a drive shaft which forms an input shaft, a driven shaft which forms an output shaft, and a planetary transmission which couples the drive shaft with the driven shaft, the planetary transmission having a planetary carrier which is non rotatably arranged on the drive shaft and carries at least one inner planetary gear which rolls on a sun gear, the inner planetary gear being coupled with an outer planetary gear turnably supported around a rotary axis of the inner planetary gear, the outer planetary gear rolling on a hollow gear which is non rotatably arranged on the driven shaft, the hollow gear having an inner toothed rim and an outer toothed rim, the outer planetary gear rolling on the inner toothed rim or on the outer toothed rim of the hollow gear, depending on an input rotary speed of the drive shaft.

17 Claims, 1 Drawing Sheet

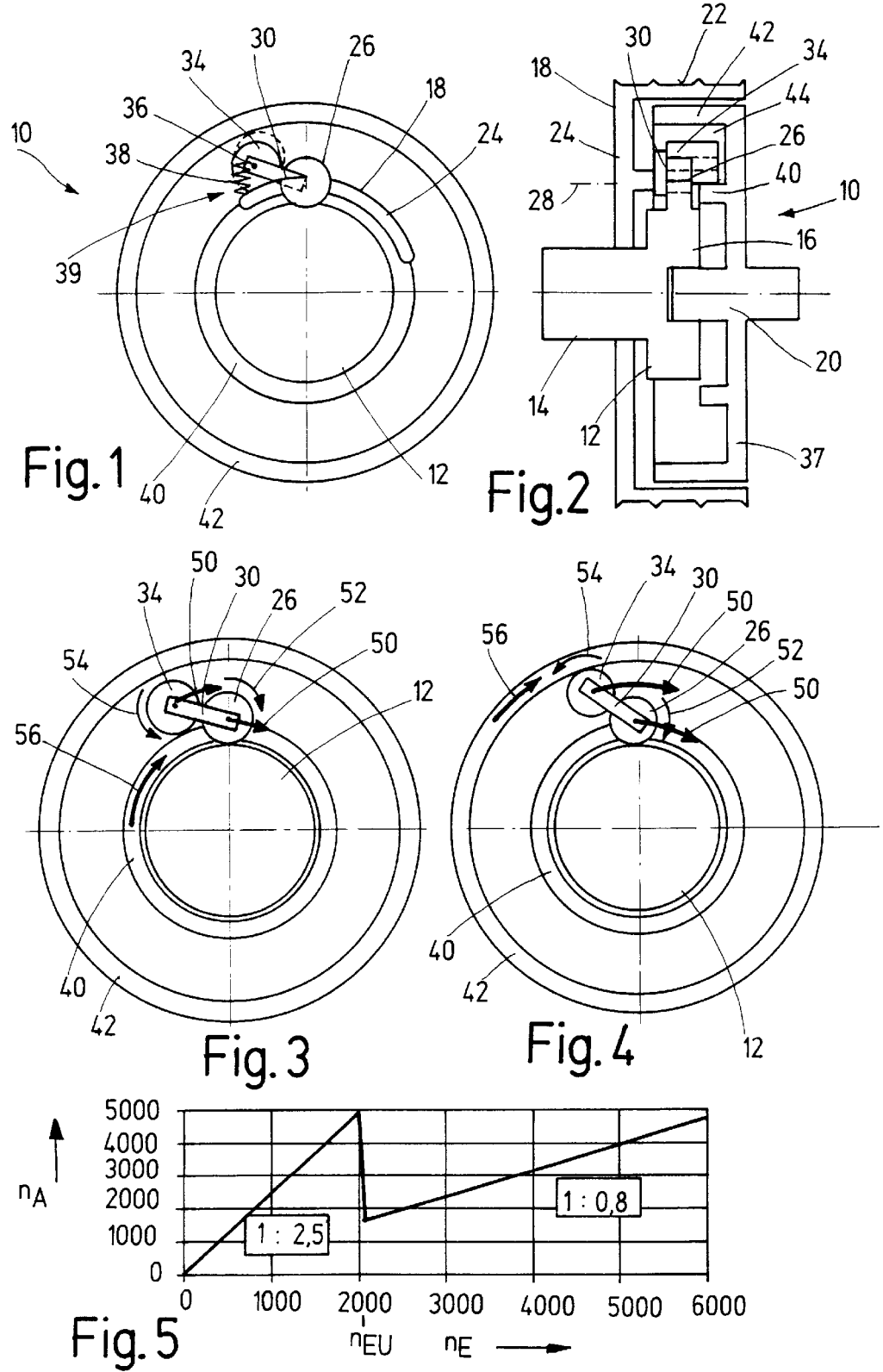

TWO SPEED TRANSMISSION IN PARTICULAR PRE-TRANSMISSION FOR AUXILIARY AGGREGATE IN MOTOR VEHICLES

BACKGROUND OF THE INVENTION

The present invention relates to a two speed transmission, in particular a pre-transmission for an auxiliary aggregate in motor vehicles.

Two-speed transmissions are known in the art. One of such transmissions is disclosed for example in U.S. Pat. No. 4,854,192 and is formed as a centrifugal-force controlled two speed transmission. Such a transmission serves for example to convert an input rotary speed available from a drive machine of the motor vehicle into an output rotary speed of the transmission. The conversion is performed in dependence on the rotary speed from a rotary speed of the input shaft of the transmission. Thereby an auxiliary aggregate of the motor vehicle must receive not the total rotary speed number of the drive machine of the motor vehicle. The disadvantage of the two speed transmission disclosed in U.S. Pat. No. 4,854,192 is that it has a relatively large construction. For converting the rotary speed, means which act axially to the rotary axis of the transmission are provided, which lead to a correspondingly great mounting space. Furthermore, a plurality of components are arranged, which lead to a relatively high manufacturing cost.

SUMMARY OF THE INVENTION

Accordingly, its an object of the present invention to provide a two speed transmission of the above mentioned general type, which avoids the disadvantages of the prior art.

In keeping with these objects and with others which will become apparent hereinafter, one feature of present invention resides, briefly stated, in a two speed transmission, which has a planetary transmission including a planetary carrier non rotatably supported on a drive shaft and carrying at least one inner planetary gear which rolls on a sun gear, the inner planetary gear is coupled with an outer planetary gear supported turnably about a rotary axis of the inner planetary gear, the outer planetary gear rolls on a hollow wheel which is non rotatably arranged on the driven shaft, the hollow gear has an inner toothed rim and an outer toothed rim, and the outer planetary gear rolls on the innertoothed rim or on the outertoothed rim of the hollow gear, depending on an input rotary speed of the drive shaft.

When the two speed transmission is designed in accordance with the present invention, it has a simple construction and requires a relatively small space.

Due to the inventive construction, it is possible in an advantageous manner to provide a simple centrifugal force switching of the two speed transmission with the components supported radially to a rotary axis of the transmission, so as to perform a rotary speed change. The two speed transmission can be realized in an especially small construction, since the arrangement of the axially displaceably supported components can be dispensed with. Due to the arrangement of all transmission elements of the two speed transmission in a plane which is located substantially radially to the rotary axis, a very short and compact construction is provided.

In accordance with a preferable embodiment of the present invention, the outer planetary gear is supported through an elastic element, preferably a pulling spring on the planetary carrier. Thereby in a simple manner it is possible to provide a rotary speed-dependent centrifugal force switching of the two gear transmission, in correspondence with the spring force of the elastic element. When the pulling spring has a degressive characteristic line, it is possible to adjust a stable switching point of the centrifugal force switching. With insignificant fluctuations of the input rotary speed of the transmission in the region of the switching rotary speed, pendulum movements of the outer planetary gear are prevented in a simple manner.

In accordance with a further embodiment of the invention, the sun gear of the two speed transmission is supported over a slip clutch on a stationary axle. Thereby in a simple manner it is possible to avoid switching jerks on the sun gear during switching of the centrifugal force change. In correspondence with the adjusted force, the slip clutch can absorb or deviate this switching jerks.

In accordance with a further preferable embodiment of the present invention, the two speed transmission has a plurality of inner and outer planetary gears, which are coupled with one another preferably in the peripheral direction. Thereby an especially good force transmission of the two speed transmission is provided, since it is distributed over the plurality of the planetary gears. Since the turning arms of the outer planetary gears are connected with one another, it is guaranteed that at reaching the switching rotary speed, a uniform switching of all planetary gears of the two speed transmission is provided. Therefore, an exact adjustment of the switching rotary speed is possible.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic side view of a two speed transmission in accordance with the present invention;

FIG. 2 is a schematic cross-section of the inventive two speed transmission;

FIG. 3 is a schematic view of the two speed transmission in a first switching position;

FIG. 4 is a schematic view of the two speed transmission in a second switching position; and FIG. 5 is a view showing a rotary speed characteristic line of the inventive two speed transmission.

DESCRIPTION OF PREFERRED EMBODIMENTS

A two speed transmission in accordance with the present invention is schematically shown in FIGS. 1 and 2 and identified with reference numeral 10. FIG. 1 shows a schematic side view, while FIG. 2 shows a schematic cross-section. The two speed transmission 10 includes a sun gear 12 which is arranged on a stationary shaft portion 14. The sun gear 12 is arranged on the shaft portion 14 through the slip clutch 16 which is not shown here.

The two speed transmission 10 includes further a drive shaft (input shaft) 18, as well as a driven shaft (output shaft) 20). The drive shaft 18 is provided with a receptacle 22 for a drive means, for example a wedge belt, a toothed belt, and the like. An inner planetary gear 26 is rotatably supported on a planetary carrier 24 of the drive shaft 18. The inner planetary gear 26 is rotatable around a rotary axis 28. The inner planetary gear 26 engages with teeth of the sun gear 12. The planetary carrier 24 further carries a turning arm 30 which is turnably supported around the rotary axis 28.

The turning arm 30 carries at its free end 32 an outer planetary gear 34. The planetary gear 34 is rotatable around a rotary axis 36. A diameter of the planetary gears 26 and 34 is selected to be identical. The planetary gears 26 and 34 are arranged so that their teeth engage with one another. The turning arm 30 is connected with the planetary carrier 24 through a spring element 38. The spring element 38 is formed as a pulling spring 39. In the initial position shown in FIG. 1, the pulling spring 39 is prestressed. In other words the turning arm 30 is loaded by the pulling spring 39 in direction of the planetary carrier 24 with a spring force.

The driven shaft 20 non rotatably supports a hollow gear 37. The hollow gear 37 has an inner toothed rim 40 and an outer toothed rim 42. The teeth of the inner toothed rim 40 face radially outwardly, while the teeth of the outer tooth rim 42 face radially inwardly. The outer planetary gear 34 engages in a free space 44 formed by the toothed rims 40 and 42. In the immovable position of the transmission 10 shown in FIGS. 1 and 2, the outer planetary gear 34 is pressed by the force of the spring element 38 against the inner toothed rim 40, so that the planetary gear 34 engages the inner toothed rim 40.

In the shown embodiment one planetary arrangement with an inner planetary gear 26 and an outer planetary gear 34 is provided. In accordance with a further embodiments it is also possible to provide over the periphery of the sun gear 12, several, for example three or four, arrangements each composed of the inner planetary gear 26 and the outer planetary gear 34.

The operation of the two speed transmission 10 is shown in FIGS. 3 and 4. The parts which correspond to the parts of FIGS. 1 and 2 are identified with the same reference numerals. The drive shaft 18 is driven through the drive means engaged in the receptacle 22. The drive means can be formed for example as a toothed belt which is driven from a driven shaft of an internal combustion engine of a motor vehicle. In correspondence with the rotary speed of the driven shaft of the internal combustion engine, a rotary speed of the drive shaft 18 is produced. It is transmitted through the planetary carrier 24 to the inner planetary gear 26, which rolls with the corresponding turning speed on the stationary sun gear 12. A movement direction 50 here is the clockwise direction. In correspondence with the rotation of the inner planetary gear 26 around the sun gear 12, it rolls also in the clockwise direction 52 on the sun gear 12. Since the outer planetary gear 34 engages the inner planetary gear 26, it performs a rotation 54 opposite to the clockwise direction and is simultaneously moved in correspondence with the drive rotary speed in a clockwise direction 50 around the sun gear 12. By the force of the spring element 38, the outer planetary gear 34 is pulled on the inner toothed rim 40 of the hollow gear 37 so that the rotation 54 of the outer planetary gear 34 opposite to clockwise direction is converted into a rotation 56 of the hollow gear 37 in clockwise direction. The drive rotation 50 in the clockwise direction and the rotation 54 of the outer planetary gear 34 opposite to the clockwise direction act at the engaging point between the outer planetary gear 34 and the toothed rim 40 in the same peripheral direction. In other words they are added and provide a fast rotary movement 56 of the hollow gear in clockwise direction.

When the rotary speed of the drive shaft 18 increases, for example by increasing the rotary speed of the driven shaft of the internal combustion engine, the centrifugal forces act on the outer planetary gear 34 and the turning arm 30, which increase with the increasing rotary speed. If a predetermined switching rotary speed is reached, the turning arm 30 and thereby the outer planetary gear 34 displace radially outwardly because of the engaging centrifugal forces, so that the outer planetary gear 34 engages with the outertoothed rim 42 of the hollow gear 37. Since the rotary direction 54 of the outer planetary gear 34 at the contact point with the hollow gear 37, here with the outer toothed rim 42, counteracts now the rotary direction 56 of the hollow gear 37 which is caused by the overlapping movement 50, a braking influence is applied to the hollow gear 37 and thereby to the driven shaft 20 of the transmission 10 non rotatably connected with the hollow gear 37. The drive rotation 50 in clockwise direction and the rotation 54 of the outer planetary gear 34 opposite to the clockwise direction, acts at the engaging point between the outer planetary gear 34 and the toothed ring 42 in opposite peripheral directions. In other words the rotation 54 reduces the peripheral speed caused by the rotation 50, and the resulting rotary movement 56 of the hollow gear in clockwise direction is lower relative to the case described in FIG. 1.

FIG. 5 shows for example a characteristic line of a rotary speed course of the transmission 10. Here over the input rotary speed $n_E$ of the drive shaft 18, the output rotary speed $n_A$ of the driven shaft is represented in revolutions per minute. With the characteristic line course it is shown that in the switching position illustrated in FIG. 3, with increasing input rotary speed $n_E$ in a relatively low region, the output rotary. speed $n_A$ raises relatively steeply. In correspondence with the contact of the outer planetary gear 34 with the inner toothed rim 40 of the hollow gear 37, a low input rotary speed $n_E$ is converted with high ratio into an output rotary speed $n_A$.

With reaching of the switching input rotary speed $n_{EU}$, which for example can amount to 2000 revolutions per minute, the centrifugal forces which act on the outer planetary gear 34 and the turning arm 30 exceed the spring force of the spring element 38, so that a switching position of the transmission 10 shown in FIG. 4 is assumed. Thereby the output rotary speed $n_A$ drops abruptly and again raises with further increasing input rotary speed $n_E$ with a relatively flat characteristic line. Thereby, starting from the switching input rotary speed $n_{EU}$, a relatively high input rotary speed $n_E$ is converted with a low ratio to the output rotary speed $n_A$.

It is therefore believed to be clear that with the inventive two speed transmission 10, an automatic adjustment of a ratio is possible, depending on the input rotary speed $n_E$. With small input rotary speeds $n_E$, the transmission 10 has a great transmission ratio, while with high input rotary speeds $n_E$, it has a small transmission ratio. Thereby it is possible to drive an aggregate which is coupled with the driven shaft 20 of the transmission 10, such as for example a generator, a steering pump, an air conditioner compressor and the like, in motor vehicles, not with the total rotary speed region of an internal combustion engine. Therefore the operation and efficiency of these components are optimized.

The transmission ratio of the two speed transmission 10 in both switching stages, or in other words ratio of the output rotary speed $n_A$ to the input rotary speed $n_E$, is obtained from the following equation:

$$\ddot{U} = 1 \pm r_{12}/r_{37},$$

where $r_{12}$ is a radius of the sun gear 12 and $r_{37}$ is a radius of the hollow gear 37.

In correspondence with the switching position of the transmission 10, as shown in FIGS. 3 and 4, $r_{37}$ is determined either by $r_{40}$ or $r_{42}$, while $r_{40}$ is a radius of the inner toothed rim 40 and $r_{42}$ is a radius of the outer toothed rim 42. Thereby the following is true in correspondence with the illustration of FIG. 3:

$$\ddot{U}1 = 1 + r_{12}/r_{40},$$

and in correspondence with the illustration of FIG. 4:

$$\ddot{U}2 = 1 - r_{12}/r_{42},$$

where $\ddot{U}1$ is a transmission ratio up to the switching input rotary speed $n_{EU}$ and $\ddot{U}2$ is a transmission ratio above the switching input rotary speed $n_{EU}$.

The minus signs are produced in that, the rotation 54 counteracts the rotation 50 and thereby at the upper engaging point 34–42 a "braking" component is produced. In FIG. 3, to the contrary, the speeds acts at the lower engaging point 34–40, which is produced from the rotations 50 and 54 in the same peripheral direction.

In correspondence with this, the transmission ratios adjustable through the ratio of the radii $r_{40}$ and correspondingly $r_{42}$, produce a spread $\ddot{U}1/\ddot{U}2$ of the transmission 10 in correspondence with the equation:

$$\ddot{U}1/\ddot{U}2 = (1 + r_{12}/r_{40})/(1 - r_{12}/r_{42}).$$

A spreading of $\ddot{U}1/\ddot{U}2$ which is suitable for an auxiliary aggregate, in particular in motor vehicles is obtained for example by adjusting of the radii ratios r40/r12=1, 5 . . . 1, 6 and r42/r12=2, 2 . . . 2, 3.

The switching input rotary speed $n_{eu}$ can be produced by a design of the spring element 38 and/or a mass distribution of the turning arm 30. The higher spring force of the pulling spring 30 is selected, the higher is the switching input rotary speed $n_{eu}$, since a higher centrifugal force (which is dependent from the input rotary speed $n_{eu}$ is required, to switch the outer planetary gear 34 from the inner toothed rim 40 to the outer toothed rim 42. The characteristic line of the pulling spring 39 is therefore degressive. In other words, with greater deviation of the pulling spring 39 the spring force decreases. Thereby it is achieved that during reaching of the switching input rotary speed $n_{eu}$, a flutter of the outer planetary gear 34 does not occur. For returning switching of the transmission 10 from the ratio $\ddot{U}2$ to the ratio $\ddot{U}1$, the input rotary speed $n_e$ must thereby fall under the switching input rotary speed $n_{eu}$. Due to the degressive spring characteristic line, the centrifugal force in the switching time point is greater than the spring force, so that no equilibrium between the spring force and the centrifugal force can be adjusted.

For absorbing a mechanical switching jerk during the switching of the coupling, the sun gear 12 is arranged on the shaft portion 14 through a slip clutch 16. Thereby short-time acting mechanical forces due to a mechanical contact on the outer planetary gear 34, are absorbed either with the inner toothed rim 40 or the outer toothed rim 42 in that the slip clutch 6 slips through briefly. After the performed switching, the coupling force of the slip clutch 16 is overcome, so that the sun gear 12 is again fixedly arranged on the shaft portion 14.

In accordance with an alternative embodiment, the contacts of the outer planetary gear 34 to the hollow gear surfaces 40 and 42 can be formed as friction pairs instead of the teeth. Thereby the noise is avoided which, despite the slip clutch can be generated by engagement of the teeth.

It will be understood that each of the elements described above, or two or more together, may also find a useful application in other types of constructions differing from the types described above.

While the invention has been illustrated and described as embodied in two speed transmission, in particular pre-transmission for auxiliary aggregate in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A two speed transmission formed as a pre-transmission for an auxiliary aggregate in motor vehicles, comprising a drive shaft which forms an input shaft; a driven shaft which forms an output shaft; and a planetary transmission which couples said drive shaft with said drive shaft; said planetary transmission having a planetary carrier which is non rotatably arranged on said drive shaft and carries least one inner planetary gear which rolls on a sun gear, said inner planetary gear being coupled with an outer planetary gear turnably supported around a rotary axis of said inner planetary gear, said outer planetary gear rolling on a hollow gear which is non rotatably arranged on said drive shaft, said hollow gear having an inner toothed rim and an outer toothed rim, said outer planetary gear rolling on said inner toothed rim or on said outer toothed rim of said hollow gear, depending on an input rotary speed of said drive shaft; and an elastic element through which said outer planetary gear is supported on said planetary carrier.

2. A two speed transmission as defined in claim 1, wherein said elastic element is a pulling spring.

3. A two speed transmission as defined in claim 1, wherein said pulling spring has an degressive spring characteristic line.

4. A two speed transmission as defined in claim 1, wherein said planetary transmission has a plurality of such inner planetary gears and such outer planetary gears which are coupled with one another.

5. A two speed transmission as defined in claim 1, wherein said toothed rims form a free space therebetween, said outer planetary gear engaging in said space, one of said toothed rims having teeth which are oriented radially outwardly, while the other of said toothed rims has teeth which are oriented radially inwardly.

6. A two speed transmission as defined in claim 1, wherein said outer planetary gear and said toothed rims have contact surfaces which are formed as friction surfaces.

7. A two speed transmission as defined in claim 4, wherein said outer planetary gears are operatively connected with one another.

8. A two speed transmission formed as a pre-transmission for an auxiliary aggregate in motor vehicles, comprising a drive shaft which forms an input shaft; a driven shaft which forms an output shaft; and a planetary transmission which couples said drive shaft with said drive shaft; said planetary transmission having a planetary carrier which is non rotatably arranged on said drive shaft and carries ta least one inner planetary gear which rolls on a sun gear, said inner planetary gear being coupled with an outer planetary gear turnably supported around a rotary axis of said inner planetary gear, said outer planetary gear rolling on a hollow gear which is non rotatably arranged on said drive shaft, said hollow gear having an inner toothed rim and an outer toothed rim, said outer planetary gear rolling on said inner toothed rim or on said outer toothed rim of said hollow gear, depending on an input rotary speed of said drive shaft; and a turning arm arranged so that said inner planetary gear is connected with said outer planetary gear through said turning arm which is turnable around said turning axis.

9. A two speed transmission as defined in claim 8, wherein said planetary transmission has a plurality of such inner planetary gears and such outer planetary gears which are coupled with one another.

10. A two speed transmission as defined in claim 8, wherein said toothed rims form a free space therebetween, said outer planetary gear engaging in said space, one of said toothed rims having teeth which are oriented radially outwardly, while the other of said toothed rims has teeth which are oriented radially inwardly.

11. A two speed transmission as defined in claim 8, wherein said outer planetary gear and said toothed rims have contact surfaces which are formed as friction surfaces.

12. A two speed transmission as defined in claim 9, wherein said outer planetary gears are operatively connected with one another.

13. A two speed transmission formed as a pre-transmission for an auxiliary aggregate in motor vehicles, comprising a drive shaft which forms an input shaft; a driven shaft which forms an output shaft; and a planetary transmission which couples said drive shaft with said drive shaft; said planetary transmission having a planetary carrier which is non rotatably arranged on said drive shaft and carries ta least one inner planetary gear which rolls on a sun gear, said inner planetary gear being coupled with an outer planetary gear turnably supported around a rotary axis of said inner planetary gear, said outer planetary gear rolling on a hollow gear which is non rotatably arranged on said drive shaft, said hollow gear having an inner toothed rim and an outer toothed rim, said outer planetary gear rolling on said inner toothed rim or on said outer toothed rim of said hollow gear, depending on an input rotary speed of said drive shaft; and a slip clutch, said sun gear being supported on a stationary shaft portion through said slip clutch.

14. A two speed transmission as defined in claim 13, wherein said planetary transmission has a plurality of such inner planetary gears and such outer planetary gears which are coupled with one another.

15. A two speed transmission as defined in claim 13, wherein said toothed rims form a free space therebetween, said outer planetary gear engaging in said space, one of said toothed rims having teeth which are oriented radially outwardly, while the other of said toothed rims has teeth which are oriented radially inwardly.

16. A two speed transmission as defined in claim 13, wherein said outer planetary gear and said toothed rims have contact surfaces which are formed as friction surfaces.

17. A two speed transmission as defined in claim 14, wherein said outer planetary gears are operatively connected with one another.

* * * * *